US010337594B2

(12) United States Patent
Baghdasarian

(10) Patent No.: US 10,337,594 B2
(45) Date of Patent: Jul. 2, 2019

(54) INCREMENTAL DEPLOYMENT DEVICE

(71) Applicant: Space Systems/Loral, LLC, Palo Alto, CA (US)

(72) Inventor: Varouj G. Baghdasarian, Cupertino, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 903 days.

(21) Appl. No.: 14/596,101

(22) Filed: Jan. 13, 2015

(65) Prior Publication Data

US 2016/0201778 A1    Jul. 14, 2016

(51) Int. Cl.

| *F16H 29/12* | (2006.01) |
|---|---|
| *F16H 53/06* | (2006.01) |
| *F16D 125/32* | (2012.01) |
| *E05D 11/06* | (2006.01) |
| *F16D 49/00* | (2006.01) |
| *F16D 63/00* | (2006.01) |
| *F16H 53/02* | (2006.01) |
| *F24S 30/00* | (2018.01) |

(52) U.S. Cl.
CPC ............. *F16H 29/12* (2013.01); *F16H 53/06* (2013.01); *E05D 11/06* (2013.01); *F16D 49/00* (2013.01); *F16D 63/008* (2013.01); *F16D 2125/32* (2013.01); *F16H 53/02* (2013.01); *F24S 2030/19* (2018.05)

(58) Field of Classification Search
CPC ... E05D 11/10; E05D 11/105; E05D 11/1064; E05D 2011/1035; E05D 11/06; F16D 63/008; F16D 2125/32; F16D 49/00

USPC ......... 16/298, 321, 334, 335, 336, 341, 342, 16/348, 357, 360
See application file for complete search history.

(56) References Cited

U.S. PATENT DOCUMENTS 3,484,831 A * 12/1969 Higuchi ............... A47C 20/045
16/333
3,769,501 A * 10/1973 McDonough ...... G03B 15/0489
431/359

(Continued)

FOREIGN PATENT DOCUMENTS

| GB | 130018 | * 7/1919 |
|---|---|---|
| GB | 207637 | * 12/1923 |

*Primary Examiner* — William C Joyce
(74) *Attorney, Agent, or Firm* — Weaver Austin Villeneuve & Sampson LLP

(57) ABSTRACT

An incremental deployment device is provided. The incremental deployment device may include a first member with a slotted track having alternating deployment and braking segments, as well as a second member that is movably coupled with the first member and that includes a cam follower that is configured to travel within the slotted track. The deployment segments may be configured to allow relative movement between the first member and the second member with little resistance, whereas the braking segments may be configured to permit relative movement between the first member and the second member with much greater resistance or to not permit any relative movement between the first member and the second member at all. Thus, the first member and the second member may be allowed to accelerate relative to one another within the deployment segments, and are decelerated within the braking segments.

18 Claims, 12 Drawing Sheets

(56) References Cited

U.S. PATENT DOCUMENTS

| | | | |
|---|---|---|---|
| 5,785,280 A * | 7/1998 | Baghdasarian | B64G 1/222 |
| | | | 136/245 |
| 5,839,548 A | 11/1998 | Parker et al. | |
| 5,862,896 A | 1/1999 | Villbrandt et al. | |
| 6,817,062 B2 * | 11/2004 | Cho | C08L 23/0815 |
| | | | 16/328 |
| 8,661,619 B2 * | 3/2014 | Lu | A47C 17/86 |
| | | | 16/321 |
| 9,683,397 B2 * | 6/2017 | Buchholz | E05D 11/105 |
| 2004/0070213 A1 | 4/2004 | Vitry | |
| 2009/0289473 A1 | 11/2009 | Kmieciak | |

* cited by examiner

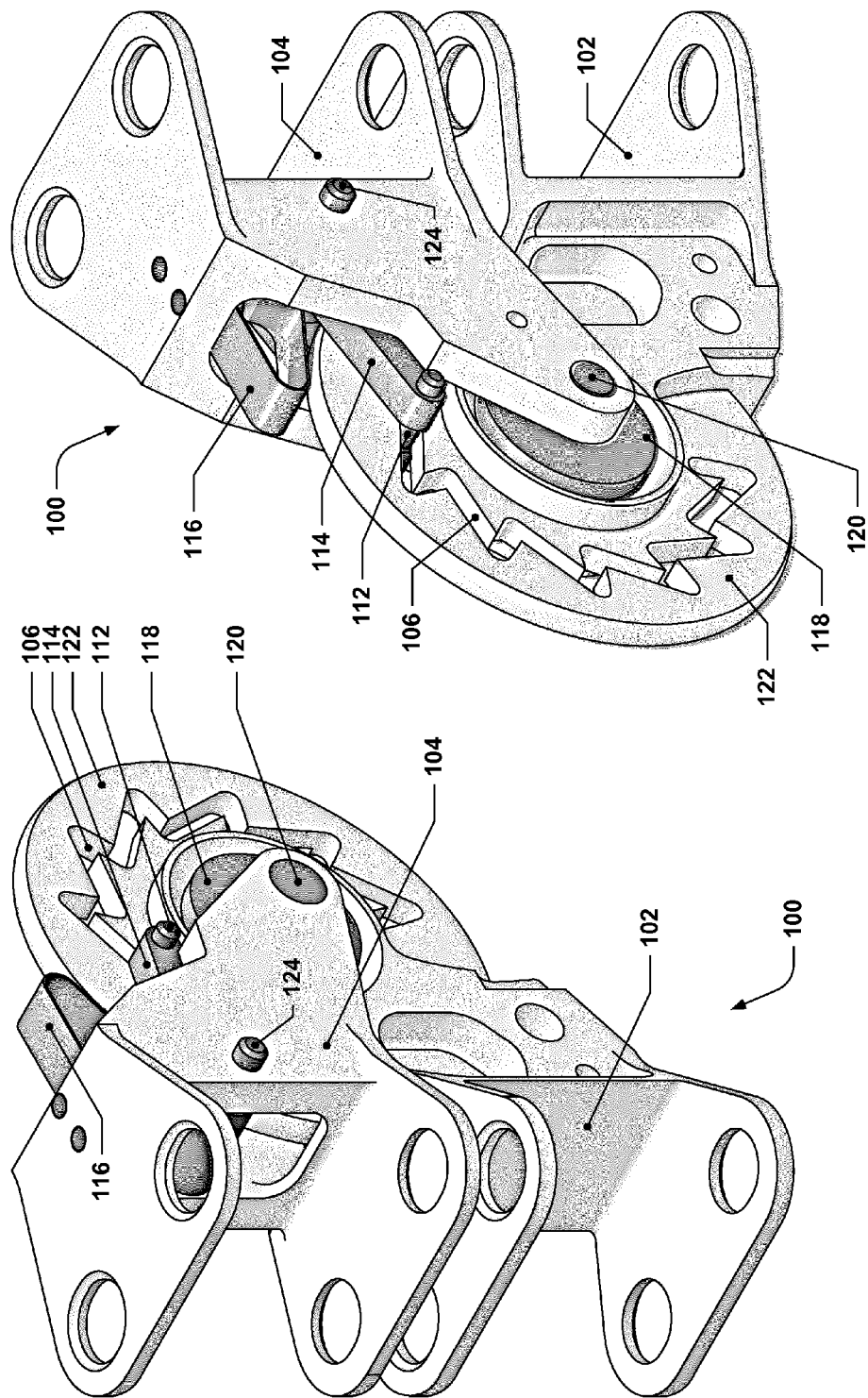

▨ Deployment segment 408
▨ Braking segment 410
▨ Overlap 409
▨ Constant-width portions 411

▨ Deployment segment 508
▨ Braking segment 510
▨ Overlap 509

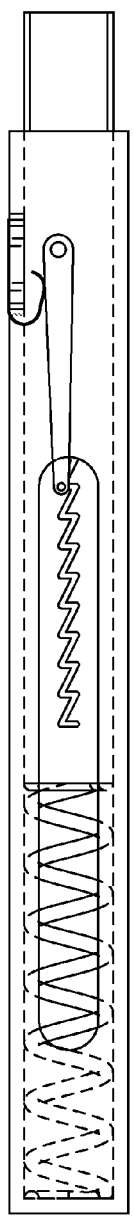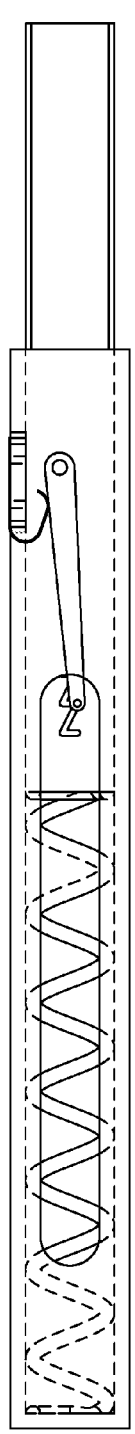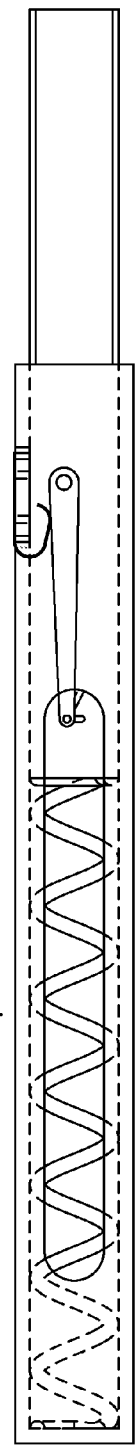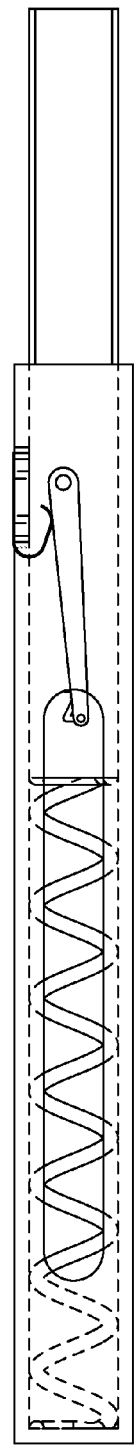
Figure 10-4  Figure 10-5  Figure 10-6  Figure 10-7

INCREMENTAL DEPLOYMENT DEVICE

TECHNICAL FIELD

This invention relates generally to mechanical, velocity-limiting devices, e.g., devices that produce a damping effect. More specifically, this invention relates to mechanisms for limiting the maximum distance through which two components may be allowed to experience acceleration with respect to one another before being subject to deceleration.

BACKGROUND OF THE INVENTION

This invention relates generally to rotary and linear displacement devices that are equipped with incremental deployment features, i.e., features that act so as to alternately a) permit two components to accelerate relative to one another and b) cause the two components to decelerate relative to one another.

The assignee of the present invention manufactures and deploys spacecraft for, inter alia, communications and broadcast services. Spacecraft often include various deployable structures, e.g., equipment booms, solar arrays, antenna reflectors, antenna masts, etc. Such structures may, for example, often be folded flat against a side of the spacecraft during launch and may then subsequently be deployed using, for example, hinged connections when the spacecraft is on-orbit. The concepts described herein were originally developed for use with such hinged connections, but it is to be understood that the concepts outlined herein may be used in any application in which it is desired to couple two components together such that they may move relative to one another while limiting their maximum speed relative to one another. Such concepts may be applied, as discussed above, to rotationally-coupled components, but may also be applied to linearly-coupled components, such as pistons or slides, or any of various other movably-coupled component arrangements.

Velocity-limiting in mechanical devices is typically performed using some type of fluidic damper, e.g., a shock absorber or a dashpot of some sort, that provides a resistive force that increases in magnitude as a function of velocity. Accordingly, when one component in a movable couple is exposed to a motive force or input relative to the other component in the couple, the moving component will undergo acceleration that is proportional to the motive force. As the relative velocity between the components increases, the fluidic damper may provide an increasing amount of damping force that acts to decelerate the moving component—at some point, the damping force will equal the motive force and the net acceleration will be zero, assuming no friction losses or other sources of energy loss, at which point the relative velocity between the two components will be at a maximum for that level of motive force.

The present inventor has conceived of a new mechanism for providing analogous functionality, but with various advantages. The concepts behind this new mechanism, as well as these advantages, are discussed in further detail below.

SUMMARY OF INVENTION

The systems, methods and devices of this disclosure each have several innovative aspects, no single one of which is solely responsible for the desirable attributes disclosed herein. One innovative aspect of the subject matter described in this disclosure can be implemented in a variety of ways.

The present inventor has appreciated that a motion-providing mechanism that provides incremental deployment behavior may be provided by using a cam follower that travels within a slotted track having alternating deployment and braking segments. While the inventor has presented several variants of such incremental deployment devices herein, the general concept of using a slotted track with alternating deployment and braking segments in cooperation with a cam follower may be applied to a variety of other incremental-deployment, motion-providing designs and all such variants are considered to be within the scope of this disclosure.

In some implementations, an apparatus is provided that includes a first member, a second member movably coupled to the first member, a slotted track, and a cam follower. In such implementations, the slotted track may be part of the first member and may include a series of alternating deployment segments and braking segments and the cam follower may be constrained to travel within the slotted track and be movably connected with the second member such that the cam follower, during relative movement between the first member and the second member, encounters the deployment segments and the braking segments in an alternating fashion. In such implementations, the deployment segments and the braking segments may cooperate with the cam follower to limit the relative speed between the first member and the second member by permitting the relative motion between the first member and the second member to accelerate when the cam follower is in the deployment segments and by causing the relative motion between the first member and the second member to decelerate when the cam follower is in the braking segments. In some such implementations, the alternating deployment and braking segments may form a sawtooth pattern.

In some implementations of the apparatus, the alternating deployment and braking segments may form a repeating pattern.

In some implementations of the apparatus, the slotted track may follow a slotted track profile path and the width of the slotted track in directions perpendicular to the slotted track profile path may remain constant for substantially the entire length of the slotted track for portions of the slotted track profile that fall outside of the regions where the braking segments and the deployment segments overlap.

In some implementations of the apparatus, each deployment segment and each braking segment may follow paths selected from the group consisting of: a straight path, a non-linear path, an arc-shaped path, and combinations thereof.

In some implementations of the apparatus, the deployment segments and the braking segments may be configured such that the cam follower traverses the deployment segments and the braking segments during relative motion between the first member and the second member without the relative motion between the first member and the second member reversing direction.

In some implementations of the apparatus, the slotted track may begin with a deployment segment and end with a braking segment.

In some implementations of the apparatus, the apparatus may further include a spring that is configured to exert a driving force between the first member and the second member.

In some implementations of the apparatus, each deployment segment may be shaped so as to cause the cam follower to travel in a first direction when the first member is subjected to a first motive input with respect to the second member and the cam follower is within the deployment segment. The first direction may have a first component that is perpendicular to an axis spanning between the non-contiguous ends of the deployment segment and the following braking segment. Correspondingly, each braking segment may be shaped such that the cam follower travels in a second direction when the first member is subjected to the first motive input with respect to the second member and the cam follower is within the braking segment. The second direction may have a second component that is perpendicular to the axis spanning between the non-contiguous ends of the deployment segment and the following braking segment. In such implementations, first component may be in an opposite direction from the second component.

In some such implementations of the apparatus, the apparatus may further include a cam follower biasing device that is configured to bias the cam follower in a third direction; the third direction may have a third component that is in the same direction as the second component.

In some additional such implementations, each deployment segment may have an average slope that is of a lower absolute magnitude than the average slope of the following braking segment with respect to the axis spanning between the non-contiguous ends of the deployment segment and the following braking segment.

In some implementations of the apparatus, the apparatus may further include a cam follower link that supports the cam follower; the cam follower link may be biased so as to press the cam follower towards the axes spanning between the non-contiguous ends of the deployment segments and the following braking segments.

In some such implementations of the apparatus, the cam follower link may be configured to rotate about a cam follower link pivot and at least one of the braking segments may be defined by arc-shaped walls that are centered on the cam follower link pivot and offset from one another such that the cam follower can traverse the at least one braking segment without corresponding movement between the first member and the second member.

In some implementations of the apparatus, the apparatus may further include a hinge pivot that movably couples the first member and the second member; in such implementations, the slotted track may travel at least partway around the hinge pivot. In some such implementations, each deployment segment may intersect with the braking segment following that deployment segment at locations along an arc-shaped path centered on the hinge pivot. In some further such implementations, the arc-shaped path may describe an arc of approximately 180° about the hinge pivot.

In some implementations, the apparatus may further include a first solar panel and a second solar panel. The first solar panel may be rigidly connected with the first member, and the second solar panel may be rigidly connected with the second member.

In some implementations of the apparatus, the first member and the second member may be configured to slide relative to one another along a first linear axis. In some further such implementations, the braking segments may be substantially perpendicular to the first linear axis.

Details of one or more implementations of the subject matter described in this specification are set forth in the accompanying drawings and the description below. Other features, aspects, and advantages will become apparent from the description, the drawings, and the claims. Note that the relative dimensions of the following figures, unless otherwise noted, may not be drawn to scale.

BRIEF DESCRIPTION OF THE DRAWINGS

FIG. 1A depicts an isometric view of an example of an incremental deployment hinge.

FIG. 1B depicts a reverse isometric view of the example incremental deployment hinge of FIG. 1A.

FIGS. 4-1 through 4-3 illustrate a slotted track, slotted track profile path, and constant-width portions of the slotted track.

FIGS. 5-1 and 5-2 depict some example slotted tracks that may be used in incremental deployment devices.

FIGS. 7-1 through 7-13 depict side section views of the example incremental deployment hinge of FIG. 1A through various stages of deployment.

FIG. 8 depicts an isometric view of an example linear spring actuator that utilizes an incremental deployment mechanism.

FIG. 9 depicts a side view of the example linear spring actuator of FIG. 8.

FIGS. 10-1 through 10-7 depict side views of the example linear spring actuator of FIG. 8 in various states of deployment.

FIGS. 1A through 3 and 7-1 through 10-7 are drawn to-scale within each Figure, although the scale may vary from Figure to Figure.

DETAILED DESCRIPTION

Figure 2:
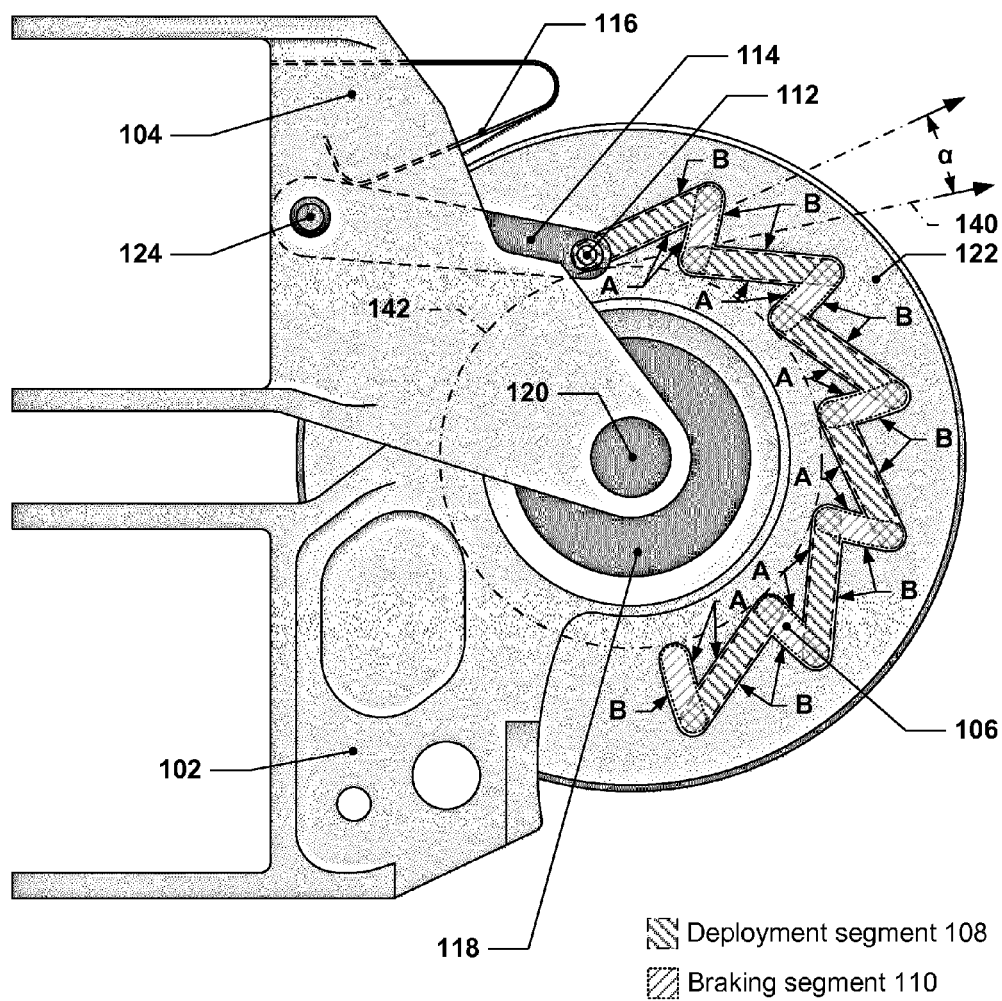
FIG. 2 depicts a side view of the example incremental deployment hinge of FIG. 1A.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to or with another element, it can be directly connected or coupled to or with the other element, or intervening elements may be present. As used herein, the term "and/or" includes any and all combinations of one or more of the associated listed items.

Although several implementations of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

As discussed above, traditional speed-limiting devices, e.g., fluidic dampers, apply a resistive force that is proportional to speed. This typically results in a smooth deceleration profile, and, when the maximum velocity for a given motive force is achieved, the moving component typically remains at that maximum velocity for the duration of its movement. Fluidic dampers are in widespread use today, including in vehicle suspensions, mechanical door-closing devices, deployment mechanisms for satellites, etc. The present inventor has determined, however, that, based on his experience, there are various aspects of traditional fluidic dampers that are undesirable in certain contexts, e.g., spacecraft designs.

For example, spacecraft may have one or more equipment booms that are rotationally coupled to the spacecraft main body by some form of sprung hinge. The equipment boom is typically held in a stowed configuration next to the spacecraft main body by one or more release devices during launch; the release devices then release the equipment boom at some point after the spacecraft separates from the launch vehicle and the spring in the sprung hinge then forces the sprung hinge to swing the equipment boom from the stowed configuration to the deployed configuration, where some form of locking mechanism latches the sprung hinge into a fixed configuration—the sprung hinge typically swings through a 90° to a 180° arc in such scenarios. While motor-driven hinges may be used, if desired, motors are typically quite heavy and require wiring, power, and control equipment, each of which represents a failure risk. As a result, most spacecraft deployment hinges are spring-loaded devices, as springs are passive, relatively light and inexpensive, and very reliable.

Left unchecked, the spring force exerted on a sprung hinge would cause the sprung hinge to accelerate until the latching event occurs, which may result in a considerable amount of kinetic energy developing in the moving components. This kinetic energy is suddenly transferred into the latch mechanism of the sprung hinge when it latches in place. Such sudden dissipation of a large amount of kinetic energy may be undesirable since it may induce large-amplitude oscillations in the equipment boom, unduly stress the components that form the equipment boom, and adversely affect the rotational orientation and/or pointing stability of the spacecraft due to momentum transfer from the rotating component to the spacecraft body. Accordingly, spacecraft designers will often equip such sprung hinges with some form of rotational mass damper in order to mitigate such kinetic energy build-up.

The present inventor has determined that this traditional approach has several shortcomings. First, rotational mass dampers may be somewhat problematic in an on-orbit environment—they may be exposed to extreme cold in the vacuum of space, and there is always a risk that fluids used within a traditional fluidic damper may change their damping characteristics with temperature, resulting in unreliable damping behavior. Such risks may be mitigated by using heaters, thermal blankets, etc. in order to control the temperature of the damping fluid, but such devices add further cost, weight, and their own potential for failure. Second, rotational mass dampers represent additional cost, bulk, and, most importantly, mass—all of which negatively impact the economics of the spacecraft design. The present inventor thus conceived of a different type of velocity-limiting device that does not rely on a working fluid to bleed off the accumulated kinetic energy.

The details of this velocity-limiting mechanism are discussed below with respect to two detailed examples, the first of which is presented in the context of a hinge that may be used to rotatably couple two solar panels within a solar panel array and the second of which is presented in the context of a piston mechanism. It is to be understood, however, that other implementations of the concepts discussed herein may involve different movable couples and other orientations of the elements discussed.

Rotational Hinge Implementation

FIG. 1A depicts an isometric view of a latching hinge 100 for a solar panel array. FIG. 1B depicts a reverse isometric view of the latching 100 of FIG. 1A. The latching hinge 100 may have a first member 102 and a second member 104, which may each be coupled to a different panel of a solar panel array. The first member 102 and the second member 104 may be configured to rotate about a pivot 120, and a torsion spring 118 (not shown in detail, but represented by a generic cylinder) may be configured to apply a bias force or moment to the first member 102 and the second member 104 to transition them from a "hinge-closed" state to a "hinge-open" state or vice-versa.

The latching hinge 100 may also have a cam follower 112, a cam follower link 114, and a slotted track 106. The slotted track 106 may be formed in a disk portion 122 of the first member. As shown, the slotted track 106 is a through-slot and extends through the entire thickness of the disk portion 122, although in other implementations, the slotted track may be a blind slot. In the latter case, there may, in some implementations, be a matching slotted track 106 on the other side of the disk portion 122, such that both sides of the disk portion 122 have matching blind, slotted tracks 106. In other implementations, the opposing slotted track 106 may follow a different path and have a separate cam follower 112 or there may be no opposing slotted track 106 at all. In the implementation shown, the cam follower 112 extends through the entire thickness of the disk portion 122, and the cam follower link 114 forms a U-shape that brackets the disk portion 122 between the arms of the U and that supports the cam follower 112 at the ends of the arms of the U. The cam follower link 114 may be configured to rotate about a cam follower link pivot 124, and may be biased in a particular direction relative to the slotted track 106 by a bias spring 116. As can be seen, the slotted track 106 has a sawtooth-pattern to it; the slotted track 106 is discussed in more detail later in this disclosure. For blind slotted tracks 106, the cam follower 112 may extend only as far as is permitted by the blind slotted track 106 depth.

It is to be understood that the cam follower 112 may be supported by other structures that allow the cam follower 112 to be supported by, but movable with respect to, the second member 104. For example, the cam follower 112 may be supported at the end of a thin, cantilevered beam that may be fixed to the second member 104 at the other end and that may flex to allow the cam follower 112 to traverse the deployment segments 108 and the braking segments 110. In such an implementation, the cantilevered beam may provide the functionality not only of the cam follower link 114, but also of the bias spring 116. Other mechanisms allowing for the cam follower 112 to be supported by the second member 104 while still allowing the cam follower 112 to move in a constrained manner to permit traversal of the deployment segments 108 and the braking segments 110 may be used as well.

FIG. 2 depicts a side view of the latching hinge 100. Portions of some components, i.e., the bias spring 116 and the cam follower link 114, are shown using hidden lines when obscured by other components, e.g., the second member 104. The slotted track 106 is formed by a series of deployment segments 108 that are indicated by regions that are diagonally-hatched with lines sloping up to the left and bordered by dashed lines and braking segments 110 that are indicated by regions that are diagonally-hatched with lines sloping up to the right and bordered by dotted lines. Each deployment segment 108 is immediately followed by a corresponding braking segment 110, although this may not be the case for the first or last segment in the chain of segments, i.e., the chain may start with a braking segment 110 and/or end with a deployment segment 108. There is some overlap between each deployment segment 108 and the adjoining braking segment(s) 110, as indicated by the cross-hatched regions formed by the overlap of the opposing diagonal hatching patterns used in each different type of segment. As can be seen, the slotted track 106 in this implementation travels through 180° of arc about the pivot 120, which permits the hinge 100 to open through 180° of arc. If only 90° of hinge opening movement were desired, then the slotted track could be reconfigured to only extend through a corresponding 90° of arc, and so forth.

The cam follower 112 may be constrained to travel within the slotted track 106, e.g., by virtue of the cam follower link 114 and the cam follower link pivot 124. As the cam follower 112 transits each deployment segment 108, it may be pressed by the bias spring 116 into the side wall A of the slotted track 106 that is, in this case, closest to the pivot 120. In other implementations, the deployment segments 108 and the braking segments 110 may be sloped in radial directions opposite from those shown, in which case the bias spring 116 may be configured to press the cam follower 112 against the opposite side wall of the slotted track 106, i.e., the side wall further from the pivot 120. As the first member 102 and the second member 104 rotate relative to one another such that the cam follower 112 transits the deployment segment 108 from left to right relative to the orientation of FIG. 2, the slope, represented by angle α in FIG. 2, of the deployment segment 108 relative to a reference vector 140 that passes through the contact point between the cam follower 112 and the side wall A of the slotted track 106 and that is also tangent to a reference circle 142 centered on the pivot 120 causes the cam follower 112 to be forced in a direction having a component traveling away from the pivot 120. The bias spring 116 may resist such movement, but the net effect on the rotational speed due to such resistance may be relatively insignificant compared to the motive force that is applied to the first member 102 and the second member 104 in order to operate the latching hinge 100 due to the mechanical advantage provided by the slope α of the deployment segment 108, the length of the cam follower link 114, and the spring constant of the bias spring 116.

As the first member 102 and the second member 104 continue to rotate relative to one another, the cam follower 112 will eventually pass by a transition point, after which the cam follower may begin to travel in a direction having a component traveling towards the pivot 120, i.e., a component in the opposite direction of the component discussed above with respect to the motion of the cam follower 112 during transit of the deployment segment. At the transition point or, more correctly, at the point where the cam follower 112 contacts the opposing side wall B of the slotted track 106, the first member 102 and the second member 104 may be at a maximum relative rotational speed for the deployment segment since the motive force has been allowed to accelerate the first member 102 relative to the second member 104 largely without any opposition.

After passing the transition point, the cam follower may then come into contact with the opposite side wall B of the slotted track 106 in braking segment 110. As can be seen, the slope, represented by angle β in FIG. 3, of the braking segment 110 relative to a reference vector 144 that passes through the contact point between the cam follower 112 and the opposite side wall B of the slotted track 106 and that is also tangent to a reference circle 146 centered on the pivot 120 may cause the cam follower 112 to be forced in a direction having a component traveling towards the pivot 120. The average slope β of the braking segment 110 is also noticeably steeper with respect to the vector 144 than the slope α of the deployment segment 108 with respect to the corresponding vector 140 for the deployment segment 108. Due to the steepness of the average slope β of the braking segment, most of the force exerted on the cam follower 112 is transmitted along the cam follower link 114 and into the cam follower link pivot 124. Thus, the cam follower 112 may impart significant force on the opposing side wall B of the slotted track 106 during its transit of the braking segment 110; this force may act in a direction that opposes the motive force that is being applied between the first member 102 and the second member 104, causing there to be a rapid deceleration event between the first member 102 and the second member 104. This deceleration may reduce the relative velocity between the first member 102 and the second member 104 to zero or to a value very close to zero. The cam follower 112 may still, however, be urged along the slotted path 106 by the slope β of the braking segment 110 and/or the force exerted on the cam follower link 114 by the bias spring 116. Relatively little relative rotational velocity will be gained during this traversal of the braking segment 110, however, due to the fact that the slope β of the braking segment 110 is such that the traversal of the braking segment 110 by the cam follower 112 only permits a small amount of rotational movement between the first member 102 and the second member 104 while the cam follower 112 is within the braking segment 110.

At low relative rotational speeds, the bias spring 116 may not only keep the cam follower 112 in intimate contact with the side wall A when the cam follower 112 is transiting the deployment segments 108, but may also keep the cam follower 112 in intimate contact with the side wall A when the cam follower 112 is transiting the braking segments 110—in such cases, there is no braking force exerted on the cam follower 112 by the opposing side wall B of the slotted track 106 in the braking segments 110, which allows the relative rotational velocity between the first member 102 and the second member 104 to increase relatively unimpeded.

At higher relative rotational speeds, however, the cam follower 112 may not be able to maintain contact with the side wall A of the slotted track 106, e.g., the strength of the bias spring 116 may be low enough and the inertia of the cam follower 112 and cam follower link 114 may be high enough that the cam follower link 114 is unable to rotate quickly enough so as to continuously press the cam follower 112 into contact with the side wall A. Since the slotted track 106 is, at least in the braking segments 110, only slightly wider than the cam follower 112, e.g., one or several thousandths of an inch, this means that the cam follower 112 will encounter the opposite side wall B after only a short distance of relative rotational movement between the first member 102 and the second member 104 after the cam follower 112 ceases to contact the side wall A.

After the relative rotational velocity between the first member 102 and the second member 104 has been stopped or nearly stopped by the interaction of the cam follower 112 with the braking segment 110, the cam follower 112 may transit the remaining length of the braking segment 110 to reach the start of the next deployment segment 108. When the cam follower 112 reaches the start of the next deployment segment 108, the above-described interactions with the side wall A and the opposite side wall B in the next deployment segment 108 and braking segment 110 may be repeated. This process may continue to repeat until the hinge 100 has fully deployed. The final braking segment 110 is not followed by another deployment segment 108 in this example, and acts, in concert with the bias spring 116, as a locking mechanism to prevent the hinge 100 from returning to its un-deployed state.

A key feature of the slotted track 106 is that at no point along the slotted track is there a point where the relative movement of the first member 102 and the second member 104 needs to be reversed in order to cause the cam follower 112 to traverse the entire length of the slotted track 106. Thus, it is always possible for the torsion spring 118 to continue to deploy the hinge 100—even if the hinge 100 has come to a full stop at any point during its deployment and has then been allowed to restart. This is in contrast to traditional ratchet mechanisms, which are configured to require a reversal of direction between the ratcheting components in order to free the ratchet pawl and permit further ratcheting movement.

The end effect of such a mechanism is that the relative rotational movement between the first member 102 and the second member 104 will slowly accelerate when the cam follower 112 is in each deployment segment 108 before suddenly coming to a halt when the cam follower 112 reaches the following braking segment 110. This causes the hinge 100 to open in an incremental fashion where the relative rotational velocity is essentially re-set at the start of each increment. In this manner, the maximum relative rotational velocity of the first member 102 and the second member 104 with respect to one another may be limited to the maximum relative rotational velocity attainable when the cam follower 112 is in any of the deployment segments 108.

Various specific characteristics of the above mechanism are discussed in more detail below.

Figure 3:
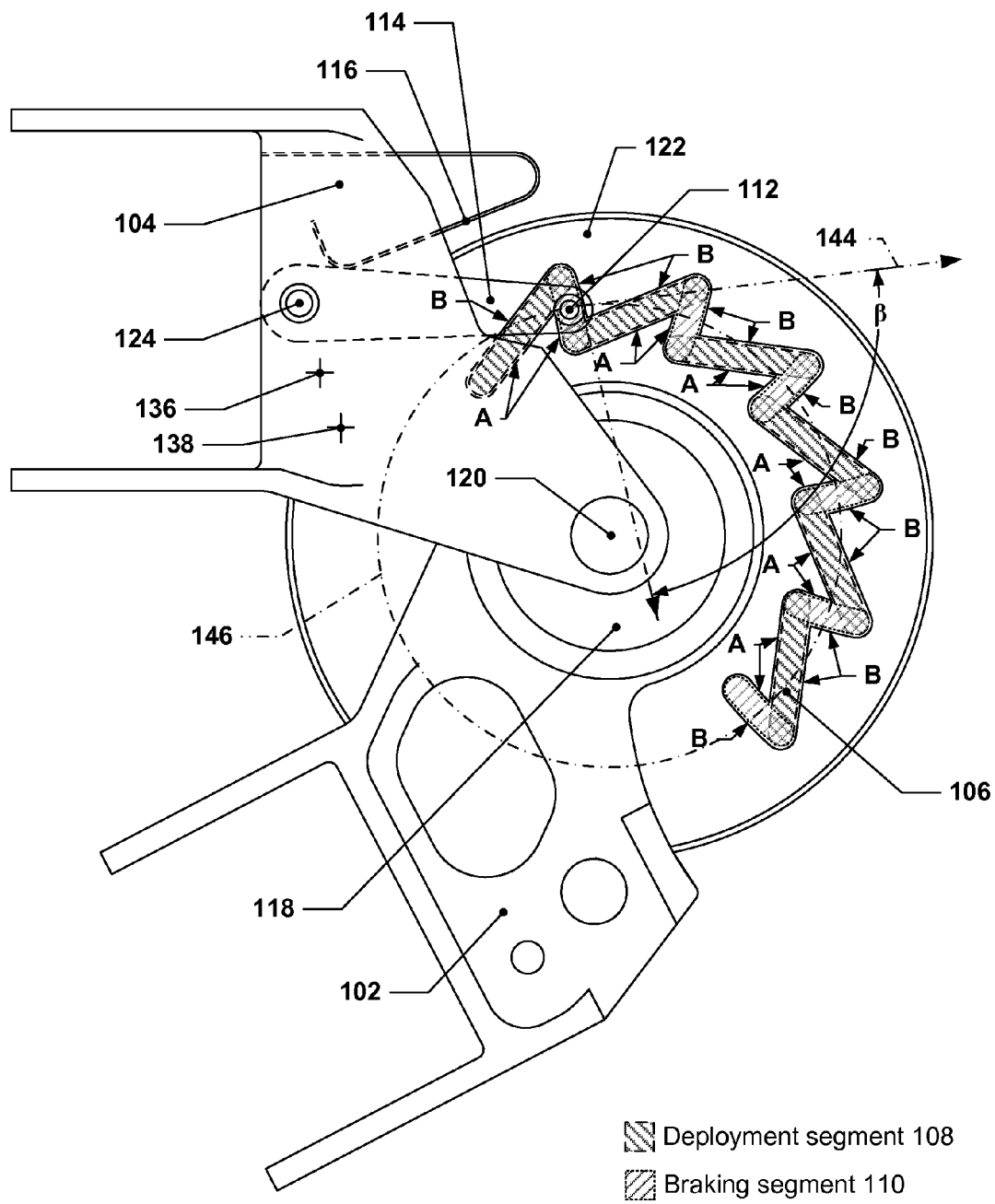
FIG. 3 depicts a side view of the example incremental deployment hinge of FIG. 1A when the hinge is in a partially-open state.
Figures 1, 4:
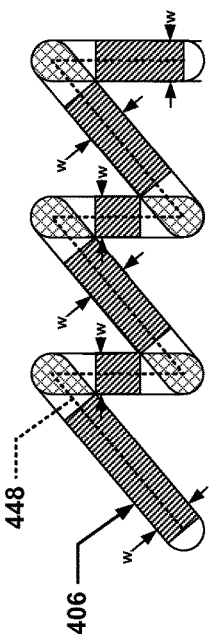
Figures 2, 4:
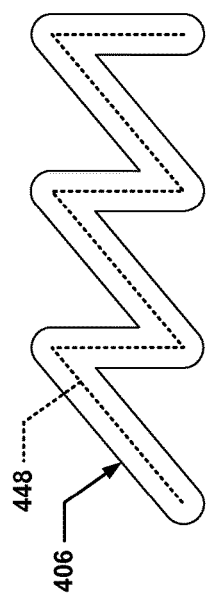
Figures 3, 4:
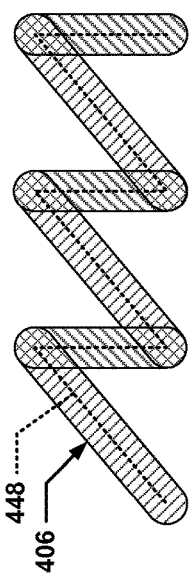

The slotted track may generally follow a slotted track profile path and may have a constant width along the length of the slotted track profile path—although in areas where the slotted track profile path experiences turns that are smaller in radius than half the nominal diameter of the cam follower, the width may not be constant since the slotted track may, in effect, self-intersect in these areas. FIGS. 4-1 through 4-3 illustrate a slotted track, slotted track profile path, and constant-width portions of the slotted track.

In FIG. 4-1, an example slotted track 406 is shown. The slotted track 406 follows a slotted track profile path 448. In FIG. 4-2, deployment segments 408, braking segments 410, and overlap areas 409 have been added to FIG. 4-1. As can be seen, in the areas where the slotted track profile path 448 undergoes sudden changes in direction, e.g., such as in the overlap areas 409, the width of the slotted track in directions perpendicular to the slotted track profile path may fluctuate. FIG. 4-3 depicts the slotted track 406 of FIG. 4-1, but with portions 411 of the slotted track 406 that have constant width W in directions perpendicular to the slotted track profile path 448 marked out. As can be seen, a substantial portion, e.g., more than 50%, of the slotted track profile path has a constant width W transverse to the slotted track profile path 448. In other implementations, however, the width of the slotted track may vary considerably along its length—when one considers that the cam follower is typically only contacting one side of the slotted track at a time, e.g., side A of the slotted track in the deployment segments or side B of the slotted track in the braking segments, it is readily apparent that the sides of the slotted track that is not in contact with the cam follower may generally be any profile that is desired. Constant-width slotted tracks, however, may eliminate the possibility of chatter or backlash in the mechanism.

As shown, the deployment segments 108 in FIGS. 1A through 3 follow a straight path, but may, in actual practice, follow non-linear paths as well, including, for example, curved paths, paths with combinations of "sloped" portions and "flat" portions. In the context of a rotational hinge such as hinge 100, these "flat" portions may be arcs having the pivot 120 as a center point—this results in the cam follower link 114 remaining stationary with respect to the second member 104 when the cam follower 112 is within these portions, combinations of curved and flat portions, etc. In the context of a linear mechanism, as discussed later in this paper, the "flat" portions may actually be flat/linear.

Figures 1, 5:
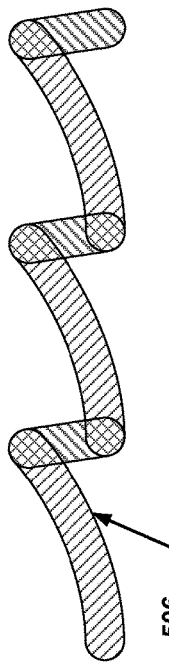
Figures 2, 5:
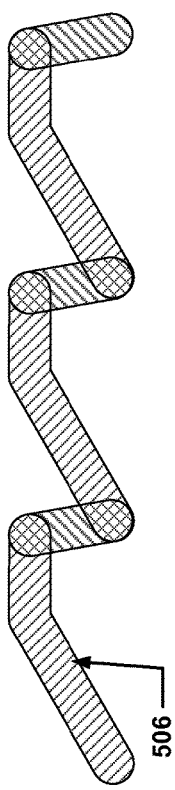

FIGS. 5-1 and 5-2 depict some example slotted tracks that may be used in incremental deployment devices. In FIG. 5-1, a slotted track 506 is shown that has non-linear deployment segments 508, each of which is provided by two flat or straight segments that are angled with respect to one another. One of the segments shown is horizontal in the Figure reference frame, and may, in actual practice, be parallel to the direction of travel between the first member and the second member (not shown). The braking segments 510 that are shown are linear segments. The deployment segments 508 and the braking segments 510 may overlap one another in the overlap areas 509. In FIG. 5-2, a slotted track 506 is shown that has non-linear, curved deployment segments 508.

The braking segments 110 shown in hinge 100 are arc-shaped, e.g., the braking segment 110 occupied by the cam follower 112 has a center point 136, which, in this case, generally corresponds in radius to the distance between the cam follower link pivot 124 and the cam follower 112's contact point with the side wall B in the braking segment 110. Various variations on this geometry may also be used to implement the concepts discussed herein. For example, the braking segments 110 may also be straight, or may follow other curved or non-linear paths. The cam follower link pivot 124 may be located at other positions as well, including, for example, at the center point 136. There may be considerable flexibility in the positions that may be selected for the cam follower link pivot 124, although there are some constraints on where the cam follower link pivot 124 may be positioned. For example, positioning the cam follower link pivot 124 at the point 138 may cause the rotational movement produced by the torsion spring 118 to rotate the cam follower link 114 counter-clockwise (with reference to FIG. 3) when the cam follower 112 is within the braking segments 110, which would cause the cam follower 112 to reverse course through the slotted track 106 and ultimately get stuck in the region where the first deployment segment 108 and the first braking segment 110 overlap. This assumes that the bias spring 116 is not sufficiently strong enough to overcome the forces exerted on the cam follower 112 by the side wall B due to the torque produced by the torsion spring 118—which is most likely the case, since the bias spring 116 only needs to provide a slight biasing force to the cam follower link 114, whereas the torsion spring 118 must provide a much larger force to components of the hinge 100. Another example of a constraint on the location of the cam follower link pivot 124 is that the cam follower link pivot 124 should generally be positioned such that the cam follower link 114 or, more accurately, the line passing through the cam follower 112 and the cam follower link pivot 124, is close to perpendicular to each braking segment 110 when the cam follower 112 is within that braking segment 110. For example, the cam follower link pivot 124 may be positioned such that the cam follower link 114 or the above-referenced line may be at an angle within 80° to 90° of a line tangent or parallel to the braking segment 110 at the contact point of the cam follower 112 with the braking segment 110. Generally speaking, it is preferable to avoid scenarios where this angle is 90° to avoid the potential for binding of the mechanism, although the bias spring 116 may act to prevent or correct such binding.

Additionally, the positioning of the cam follower link pivot 124 may also be constrained so as to avoid positions where the cam follower link 114 or the above-referenced line passing through the cam follower link pivot 124 and the cam follower 112 and a line tangent or parallel to the side wall A at the point where the cam follower 112 is contacting the side wall A are perpendicular or nearly perpendicular to one another when the cam follower 112 is within a deployment segment. The cam follower link pivot 124 may instead be positioned such that the cam follower link 114 or the above-referenced line passing through the cam follower link pivot 124 and the cam follower 112 and the line tangent or parallel to the side wall A at the point where the cam follower 112 is contacting the side wall A are generally oblique or parallel, e.g., within 0° to 80° of each other.

It is also to be understood that other mechanisms may be used to constrain the movement of the cam follower 112, i.e., a cam follower link 114 is not needed in all implementations and may be replaced using other mechanisms that permit the cam follower 112 to move along an arced or linear path similar to that provided by the cam follower link 114, as discussed elsewhere in this paper. It is also to be understood that while the depicted examples in this paper have featured regular, repeating patterns of deployment segments and braking segments, e.g., sawtooth shapes, other implementations may feature irregular repeating patterns of deployment segments and braking segments. Thus, deployment and/or braking segments may have different sizes, shapes, etc. along the slotted track.

Figure 6:
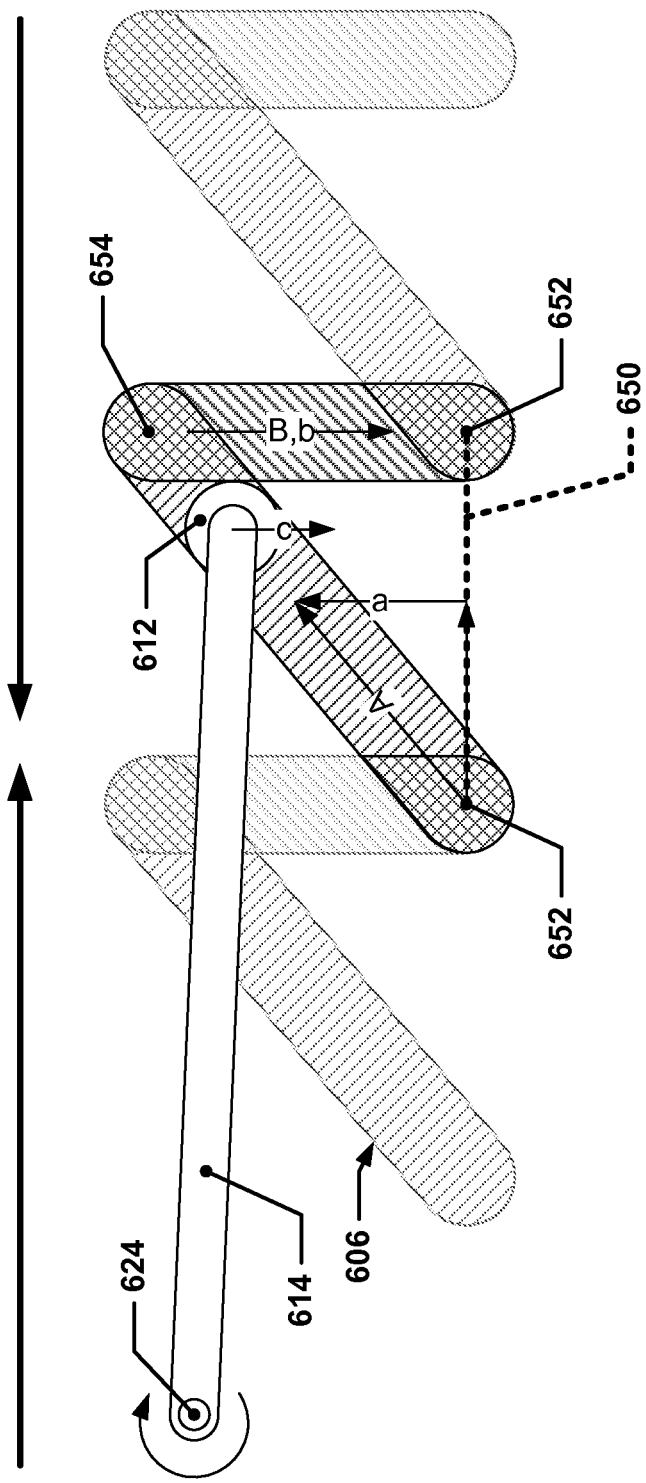
FIG. 6 provides a convenient reference frame for understanding the motion of the cam follower within the slotted track.

FIG. 6 may provide a convenient reference frame for understanding the motion of the cam follower within the slotted track, as well as the conventions used in this paper. Shown in FIG. 6 is a slotted track 606 that has three deployment segments 608 and three braking segments 610. A cam follower 612 is supported by a cam follower link 614 that is configured to pivot about a cam follower link pivot 624, which is attached to a second member (not shown). The slotted track is part of a first member (also not shown). In the depicted example, the second member, the cam follower 612, the cam follower link 614, and the cam follower link pivot 624 travel from left to right in the Figure relative to the slotted track 606 and the first member, and the slotted track 606 and the first member travel from right to left in the Figure relative to the cam follower 612, the cam follower link 614, the cam follower link pivot 624, and the second member. Thus, as the cam follower 612 traverses the slotted track during this motion, the cam follower 612 repeatedly encounters a deployment segment 608 that is immediately followed by a braking segment 610. Thus, as used herein, the braking segment 610 that is encountered by the cam follower 612 immediately after the cam follower 612 is within a particular deployment segment 608 may be referred to as the "following" braking segment 610 with respect to that particular deployment segment. Thus, the braking segment 610 that is immediately to the right of any one of the deployment segments 608 in FIG. 6 may be referred to as the "following" braking segment 610 of that deployment segment 608.

As can be seen, each deployment segment 608 is contiguous with the adjoining braking segment(s) 610 in overlap areas 609. When a deployment segment 608 and a following braking segment 610 are viewed as a unit, it can be seen that the deployment segment 608 and the following braking segment 610 have contiguous ends 654, which overlap in an overlap area 609, as well as non-contiguous ends 652, which do not overlap with one another. The non-contiguous ends 652 may overlap and be contiguous with other deployment segments 608 or other non-following braking segments 610, but these other segments are not part of the deployment segment 608 in question or of the following braking segment 610. For clarity, only the middle deployment segment 608/following braking segment 610 in FIG. 6 is shown in black lines; the other couplets shown to the left and right of the middle couplet, are shown using grey lines, but are otherwise identical to the middle couplet.

The non-contiguous ends 652 of a deployment segment 608/following braking segment 610 couplet may be viewed as defining an axis 650 that spans between the two non-contiguous ends. As can be seen, each deployment segment 608 has a slope that is of a lower absolute magnitude than the slope of the following braking segment 610 with respect to the axis 650. It is to be understood that for non-linear deployment segments 608 and/or non-linear braking segments 610, this observation still holds true, but with respect to the average slope(s) of such segments.

During movement of the cam follower 612 through the deployment segment 608, the deployment segment 608 may force the cam follower 612 in a first direction "A"; the first direction A may have a component "a" that is perpendicular to, and points away from, the axis 650. During movement of the cam follower 612 through the following braking segment 610, however, the following braking segment 610 may cause the cam follower 612 to move in a second direction "B"; the second direction B may have a component "b" that is perpendicular to, and points towards, the axis 650. It is to be understood that in some implementations, the geometry of the following braking segment 610 may be such that it does not force the cam follower 612 to travel in the second direction B, but cam follower 612 may instead be forced in the second direction B by the action of a cam follower bias device, which is not shown here but is described in other implementations discussed herein (see bias spring 116, for example). In such cases, the following braking segment 610 may cooperate with the spring bias device so as to cause the cam follower 612 to move in the second direction B. For example, in the depicted implementation, a rotational couple in the cam follower link 614 is induced about the cam follower link pivot 624 so as to cause the cam follower 612 to be biased in a third direction C having a third component "c." The third direction C is not explicitly shown in FIG. 6 to avoid obscuring the third component c, but would originate at the cam follower 612, be tangent to a circle centered on the cam follower link pivot 624, and be pointed towards the axis 650. As can be seen, the first component a is oriented in an opposite direction from both second component b and third component c.

Figures 1, 7:
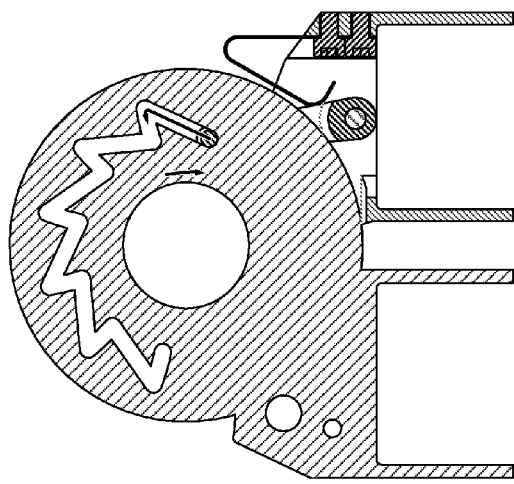
Figures 2, 7:
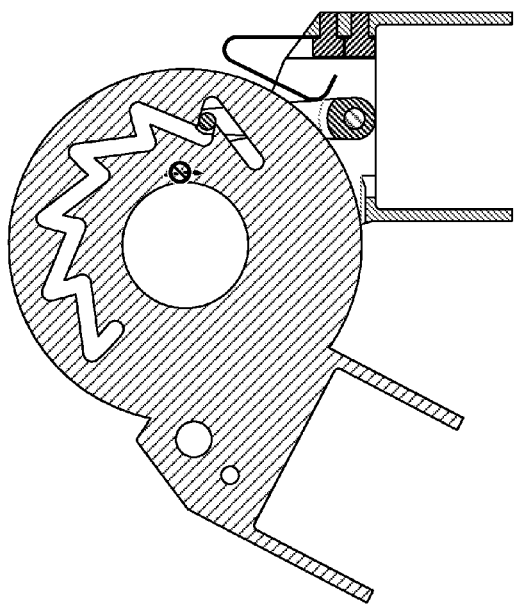
Figures 3, 7:
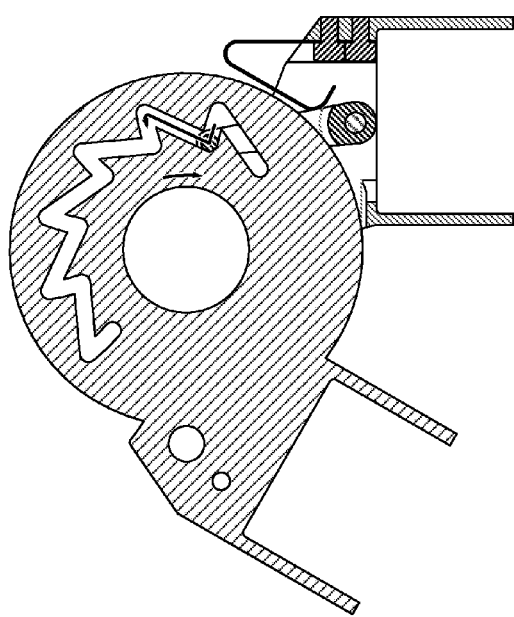
Figures 4, 7:
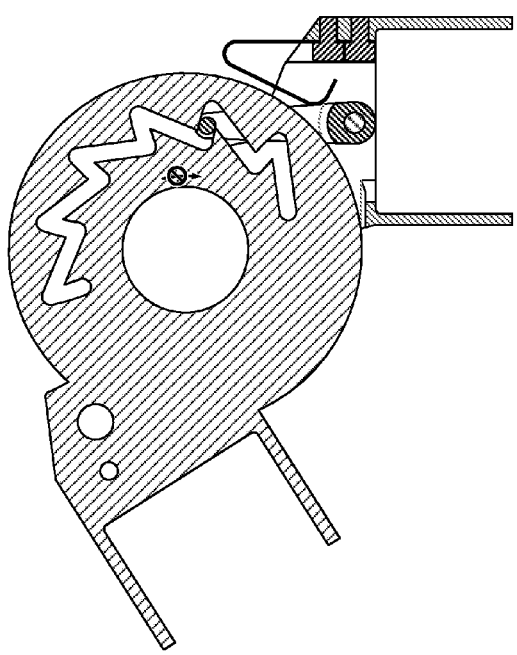
Figures 5, 6, 7:
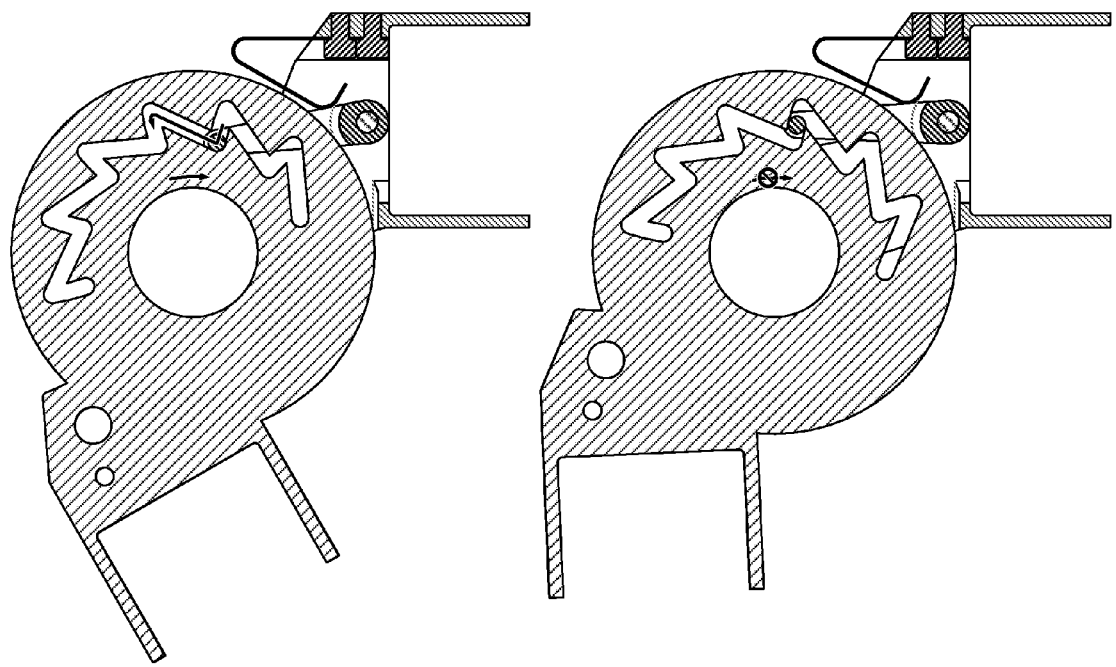
Figure 7:
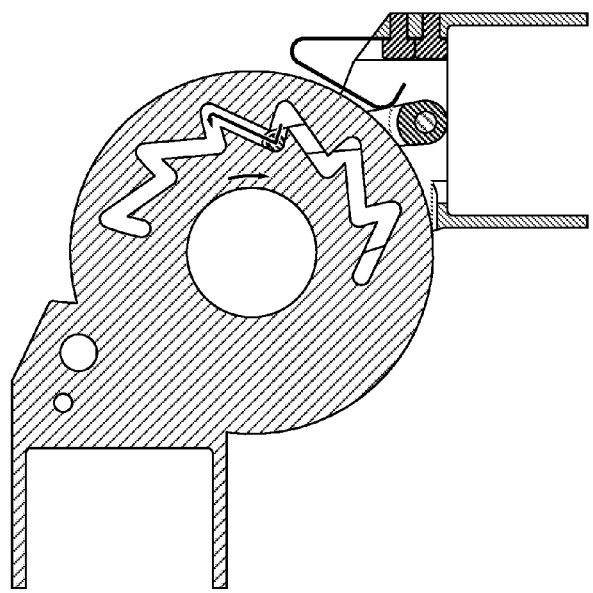

FIGS. 7-1 through 7-13 show cross-sectional views of the hinge 100 in various stages of deployment from a hinge-open condition as shown in FIG. 7-1 to a hinge-closed condition as shown in FIG. 7-13; these labels are merely labels of convenience, and the hinge may just as easily be viewed as transitioning from a hinge-closed condition to a hinge-open condition. To avoid undue visual clutter, the various components shown are not separately called out, and the reader is referred to FIGS. 2 and 3 for identification of the depicted elements. In these Figures, the second member 104 is treated as "stationary" and the first member 102 is treated as the "moving" member of the coupled pair, although such distinctions are simply a matter of convenience since it is relative rotational movement between the first member 102 and the second member 104 that is ultimately at issue.

As can be seen, the first member 102 is free to rotate about the pivot 120 with respect to the second member 104 in FIGS. 7-1, 7-3, 7-5, 7-7, 7-9, 7-11, and 7-13. The cam follower 112 may thus move, with respect to the deployment segment 108 that it is within, in the direction shown by the arrow that passes through the cam follower 112 in these Figures, while the first member 102 may rotate as shown by the corresponding arced arrows in each of these Figures. In FIGS. 7-2, 7-4, 7-6, 7-8, 7-10, and 7-12, the cam follower 112 has encountered the opposite wall B of the slotted track 106 and has stopped the first member's rotational movement; the absence of rotational motion is indicated by the arrow with the circled-slash indicator (Ø) over it in these Figures.

Linear Slide Implementation

As discussed above, the incremental deployment concepts discussed herein may also be applied with respect to components that are movably coupled together in a non-rotational manner. For example, the concepts described herein may be applied in a linear-actuator context to limit the maximum speed with which the linear actuator deploys.

Figures 7, 8:
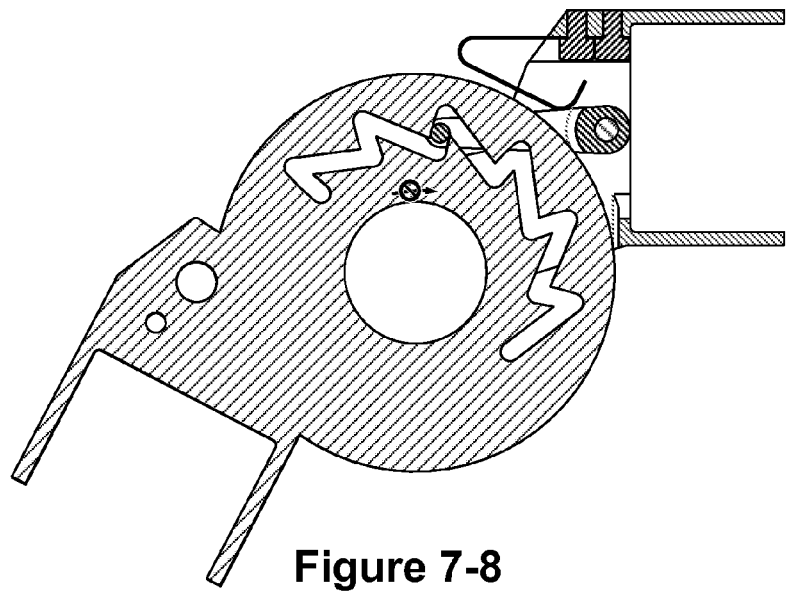

FIG. 8 depicts an isometric view of a linear spring actuator 800 that utilizes an incremental deployment mechanism. Visible in FIG. 8 is a first member 802 and a second member 804. The first member 802 is slideably engaged with the second member 804 and includes a slotted track 806. The first member 802 is urged out of the second member 804 by a spring 818, which is compressed within the second member 804 and exerts a compressive force on the end of the first member 802 that is inserted into the second member 804. The first member 802 thus is able to slide out of the second member 804 along a linear axis. A cam follower 812 is configured to travel within the slotted track 806 and a cam follower link 814 is configured to support the cam follower 812 at one end and to pivot about a cam follower link pivot 824 at the other. A bias spring 816 is configured to urge the cam follower link 814, and thus the cam follower 812, towards a side A of slotted track 806.

Figures 7, 8, 9:
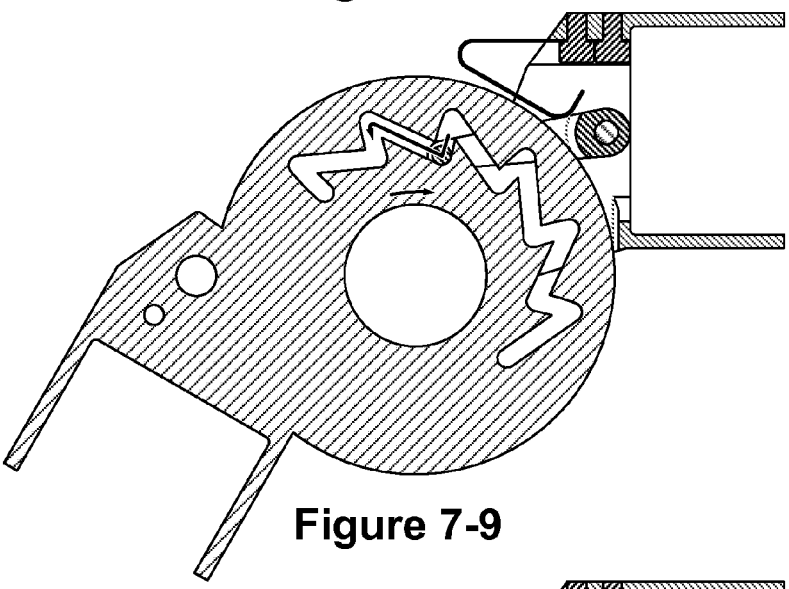

FIG. 9 depicts a side view of the example linear spring actuator of FIG. 8. As with the slotted track 106 of the hinge implementation discussed earlier, the slotted track 806 can be seen to include a series of alternating deployment segments 808, which are indicated by regions within the slotted track 806 outlined in dashed lines and filled with diagonal line hatching that slopes up to the left, and braking segments 810, which are indicated by regions within the slotted track 806 outlined in dotted lines and filled with diagonal line hatching that slopes up to the right. The deployment segments 808 and the braking segments 808 may share some common portions where they overlap.

Figures 7, 8, 9, 10:
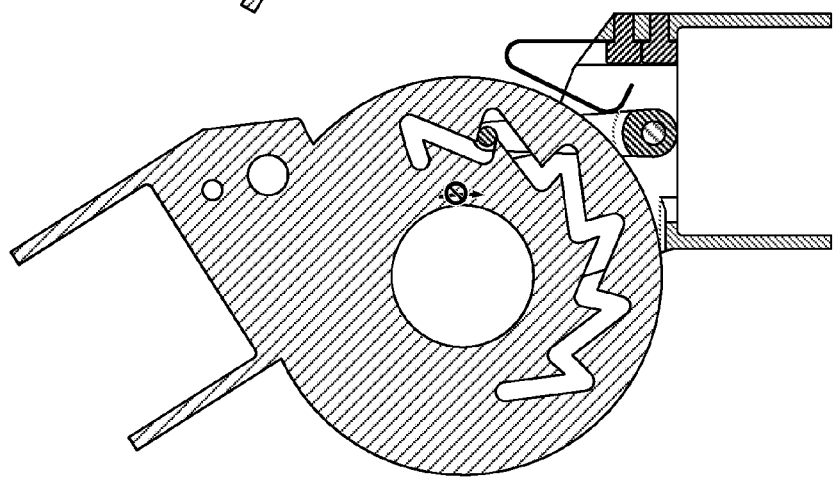
Figures 7, 8, 9, 10, 11:
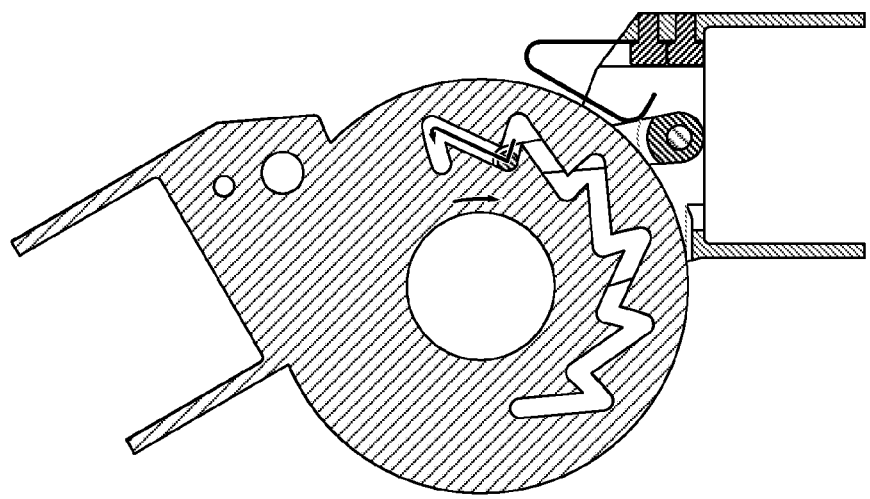
Figures 7, 8, 9, 10, 11, 12:
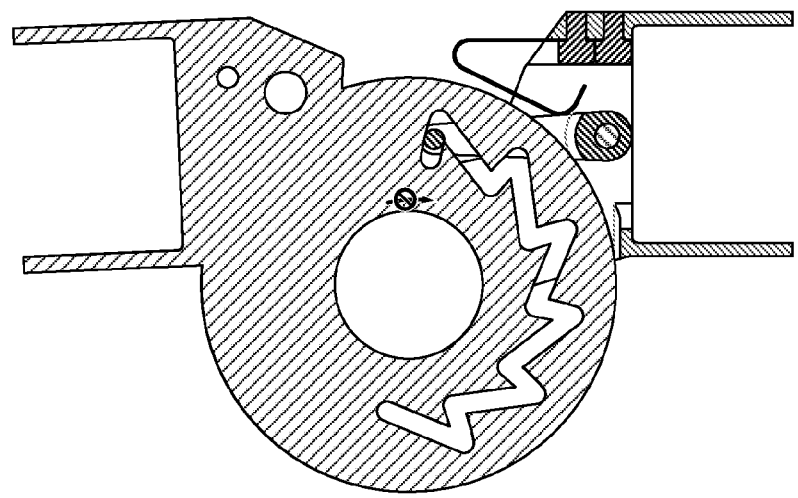
Figures 7, 8, 9, 10, 11, 12, 13:
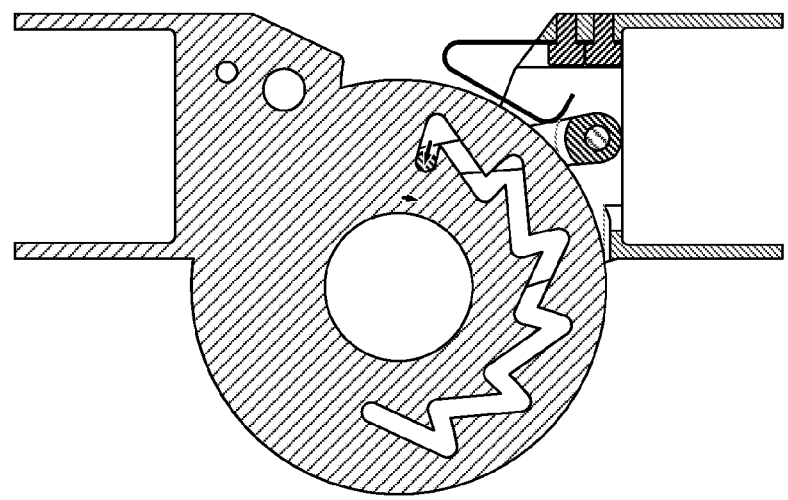
Figure 8:
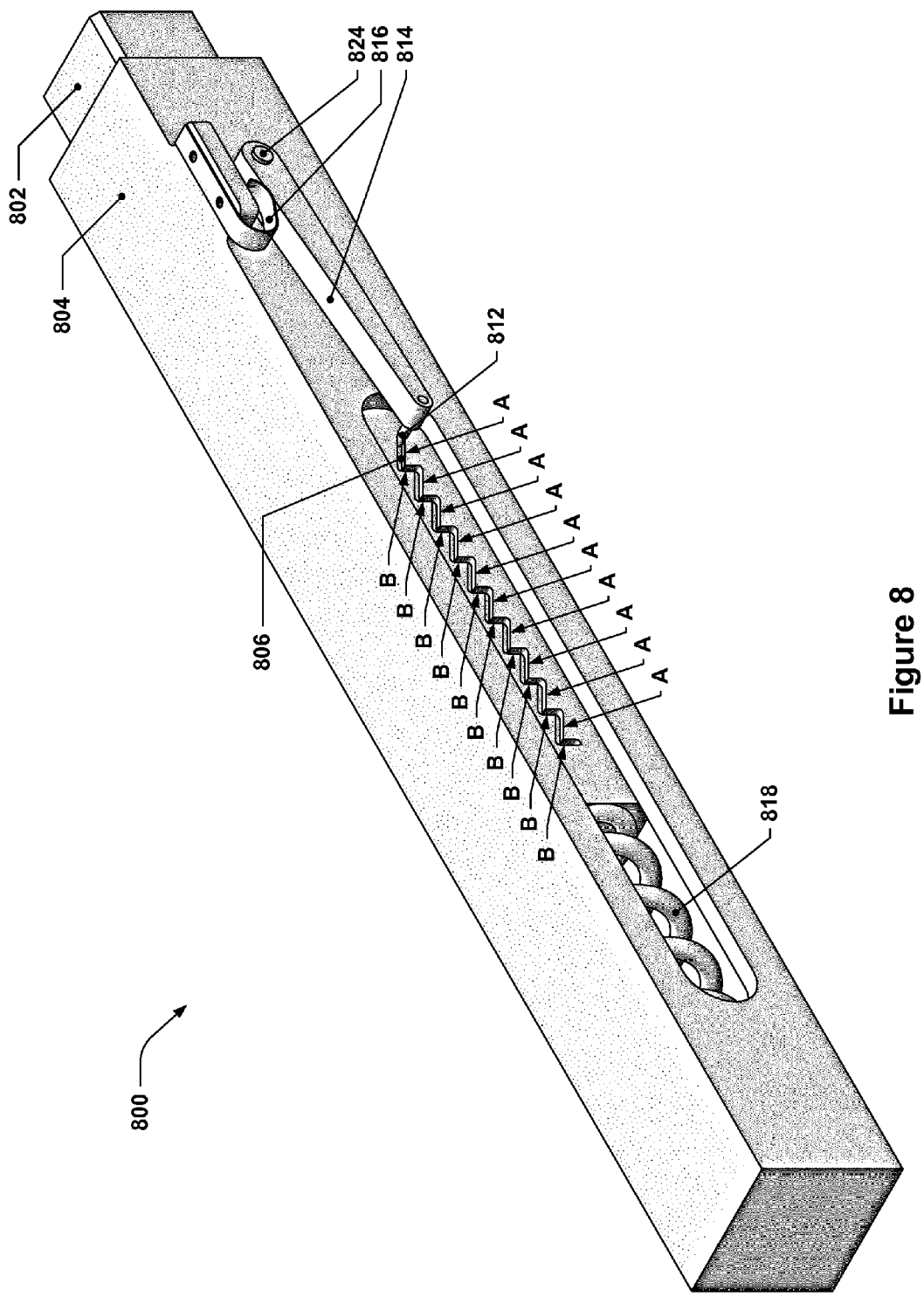
Figure 9:
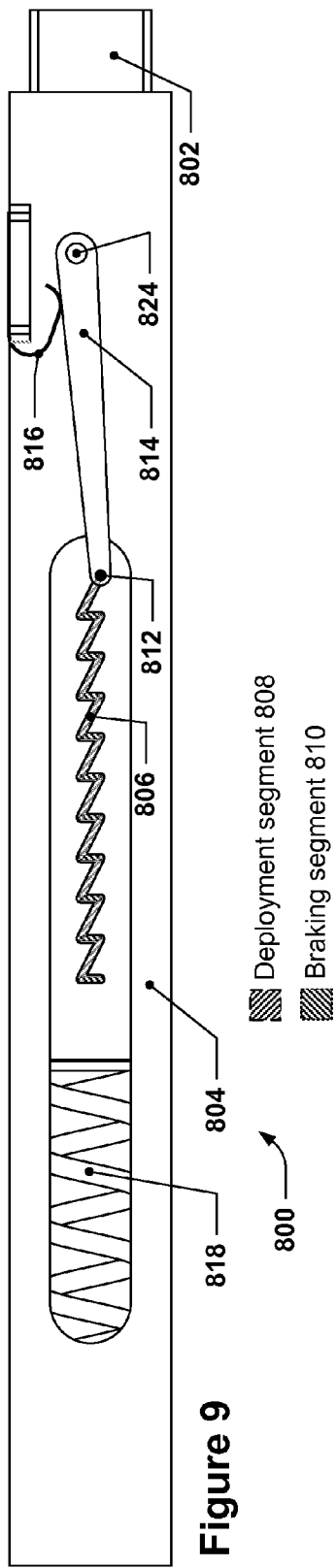
Figures 1, 10:
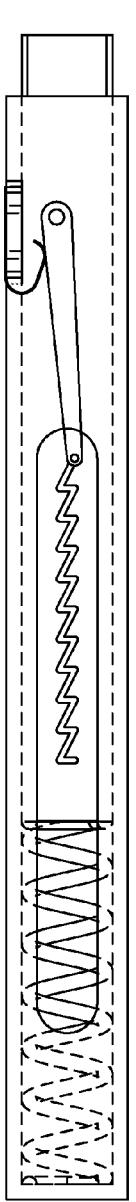
Figures 2, 10:
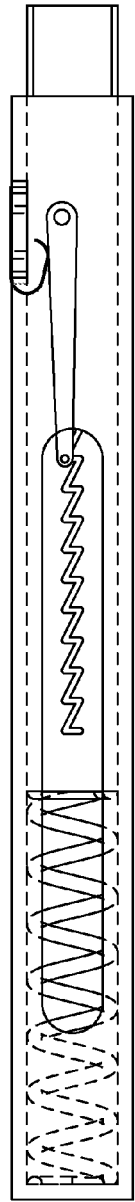
Figures 3, 10:
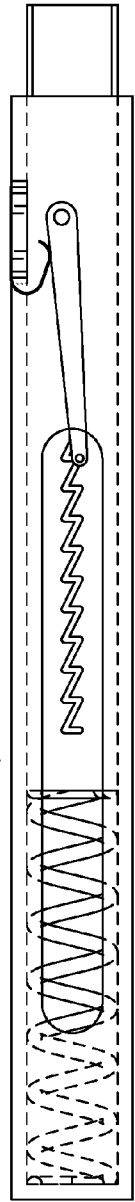

FIGS. 10-1 through 10-7 depict side views of the example linear spring actuator of FIG. 8 in various states of deployment. As can be seen, the first member 802 is pushed out of the second member 804 by the compressive force exerted on the end of the first member 802 by the spring 818. The spring 818 is allowed to accelerate the first member 802 with relatively little resistance by the cam follower 812 and the cam follower link 814/bias spring 816 combination when the cam follower is within the deployment segments 808 since the cam follower 812 is able to slide up side A of the deployment segments 808 with little resistance due to the shallowness of the slope of the deployment segments 808. FIGS. 10-2, 10-4, and 10-6 depict the linear spring actuator just after the cam follower link has traversed the deployment segment 808 just to the right, with respect to the perspective used in these Figures, of the cam follower 812.

The relatively free acceleration experienced by the first member 802 within the deployment segments 808 is counteracted by the actions of the braking segments 810. When the cam follower 812 transitions into the braking segment 810 immediately following a deployment segment 808, if the speed of the first member 802 with respect to the second member 804 is high enough, i.e., greater than a desired amount, then the cam follower 812 may impact side B of the slotted track 806 within the braking segments 810. Due to the slope of the braking segments 810, the majority of this impact force may be transmitted along the cam follower link 814 to the cam follower pivot 824, which may, in turn, resist further or most further translational movement of the first member 802 with respect to the second member 804 until the cam follower 812 has traversed the braking segment 810. Thus, there is little, if any, relative translational movement between the first member 802 and the second member 804 evident in FIGS. 10-3, 10-5, and 10-7, which depict the cam follower 812 at the end of various braking segments 810.

As with the hinge implementation, the relative speed between the first member 802 and the second member 804 is generally limited by the maximum speed that may be developed within the individual deployment segments. Similarly, if the deployment speed reached in the deployment segments is low enough that the bias spring 816 causes the cam follower 812 to maintain contact with side "A" of the slotted track 806 throughout the traversal of the slotted track 806 by the cam follower 812, then there will be no contact with side "B" of the slotted track 806 and thus no braking effect. However, if the relative speeds developed between the first member 802 and the second member 804 in the deployment segments 808 are fast enough, the cam follower 812 will not be able to traverse the braking segments 810 before impacting the opposite side wall B of the slotted track. This causes the first segment 802 and the second segment 804 to decelerate relative to each other, e.g., decelerate to a temporary standstill or near-standstill. In this manner, the relative velocity, and thus the kinetic energy developed within the system, is never allowed to exceed a certain predetermined amount.

The various bias spring types and characteristics, spring drive mechanisms, cam follower link geometries/placement, etc. may be selected, in conjunction with the exact slotted track geometry, based on the desired maximum allowable relative speed between the first member and the second member. The materials used for the various components may, for example, include materials such as aluminum alloys, titanium alloys, magnesium alloys, steel alloys, composites, etc. Generally speaking, the load-bearing components, e.g., the cam follower, cam follower link, slotted track, etc., should be made from a material that will not permanently deform in response to the braking loads that are experienced in the braking segments. For example, if the slotted track is machined into a first member made of a soft material that deforms when the cam follower impacts the side wall B in the braking segments, the resulting deformation may act as a detent within which the cam follower comes to rest. Depending on the precise geometry of the slotted track and the bias spring strength, the detent may prevent the cam follower from traversing the remaining length of the braking segment and cause the incremental deployment device to jam. Such issues, however, may be addressed by taking steps to either reduce the stresses experienced (by changing the geometry of the device) or by selecting a more resilient material.

Although several implementations of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

What is claimed is:

1. An apparatus comprising:
a first member;
a second member movably coupled to the first member such that the first member and the second member are transitionable from a first configuration to a second configuration;
one or more springs that are configured to urge the first member and the second member towards the second configuration;
a slotted track, wherein:
the slotted track is part of the first member,
the slotted track has opposing side walls that define two intermeshing sawtooth profiles, and
the slotted track includes a series of alternating deployment segments and braking segments;
a cam follower; and
a cam follower biasing device, wherein:
the cam follower biasing device is configured to bias the cam follower towards only one of the two opposing sidewalls,
the cam follower is constrained to travel within the slotted track,
the cam follower is movably connected with the second member, and
the cam follower, during relative movement between the first member and the second member from the first configuration to the second configuration, encounters the deployment segments and the braking segments in an alternating fashion,
the deployment segments and the braking segments are configured to:
cooperate with the cam follower during relative movement of the first member and the second member from the first configuration to the second configuration to limit the relative speed between the first member and the second member by permitting the relative motion between the first member and the second member to accelerate when the cam follower is in the deployment segments and by causing the relative motion between the first member and the second member to decelerate when the cam follower is in the braking segments, and
permit the first member and the second member to be transitioned from the first configuration to the second configuration subject only to the urging of the one or more springs.

2. The apparatus of claim 1, wherein the alternating deployment and braking segments form a sawtooth pattern.

3. The apparatus of claim 1, wherein the alternating deployment and braking segments form a repeating pattern.

4. The apparatus of claim 1, wherein:
the slotted track follows a slotted track profile path,
each adjacent pair of braking and deployment segments partially overlap with one another when viewed along a direction perpendicular to a plane coincident with the slotted track profile path, and
the width of the slotted track in directions perpendicular to the slotted track profile path remains constant for substantially the entire length of the slotted track for portions of the slotted track profile that fall outside of regions where the braking segments and the deployment segments overlap.

5. The apparatus of claim 1, wherein each deployment segment and each braking segment follow paths selected from the group consisting of: a straight path, a non-linear path, an arc-shaped path, and combinations thereof.

6. The apparatus of claim 1, wherein the deployment segments and the braking segments are configured such that the cam follower traverses the deployment segments and the braking segments during relative motion between the first member and the second member without the relative motion between the first member and the second member reversing direction.

7. The apparatus of claim 1, wherein the slotted track begins with a deployment segment and ends with a braking segment.

8. The apparatus of claim 1, wherein for each deployment segment and the following braking segment:
the deployment segment is shaped so as to cause the cam follower to travel in a first direction when the first member is subjected to a first motive input with respect to the second member and the cam follower is within the deployment segment,
the first direction has a first component that is perpendicular to an axis spanning between non-contiguous ends of the deployment segment and the following braking segment,
the braking segment is shaped such that the cam follower travels in a second direction when the first member is subjected to the first motive input with respect to the second member and the cam follower is within the braking segment,
the second direction has a second component that is perpendicular to the axis spanning between the non-contiguous ends of the deployment segment and the following braking segment, and
the first component is in an opposite direction from the second component.

9. The apparatus of claim 8, wherein:
the cam follower biasing device is configured to bias the cam follower in a third direction, and
the third direction has a third component that is in the same direction as the second component.

10. The apparatus of claim 8, wherein each deployment segment has an average slope that is of a lower absolute magnitude than the average slope of the following braking segment with respect to the axis spanning between the non-contiguous ends of the deployment segment and the following braking segment.

11. The apparatus of claim 8, further comprising a cam follower link, wherein:
the cam follower is supported by the cam follower link, and
the cam follower link is biased so as to press the cam follower towards the axes spanning between the non-contiguous ends of the deployment segments and the following braking segments.

12. The apparatus of claim 11, wherein:
the cam follower link is configured to rotate about a cam follower link pivot, and
at least one of the braking segments is defined by arc-shaped walls that are centered on the cam follower link pivot and offset from one another such that the cam follower can traverse the at least one braking segment without corresponding movement between the first member and the second member.

13. The apparatus of claim 8, further comprising a hinge pivot, wherein:
   the first member and the second member are movably coupled by the hinge pivot, and
   the slotted track travels at least partway around the hinge pivot.

14. The apparatus of claim 13, wherein each deployment segment intersects with the braking segment following that deployment segment along an arc-shaped path centered on the hinge pivot.

15. The apparatus of claim 14, wherein the arc-shaped path describes an arc of approximately 180° about the hinge pivot.

16. The apparatus of claim 13, further comprising a first solar panel and a second solar panel, wherein:
   the first solar panel is rigidly connected with the first member, and
   the second solar panel is rigidly connected with the second member.

17. The apparatus of claim 8, wherein the first member and the second member are configured to slide relative to one another along a first linear axis.

18. The apparatus of claim 17, wherein the braking segments are substantially perpendicular to the first linear axis.

* * * * *